US009661029B2

(12) United States Patent
Lotfallah et al.

(10) Patent No.: US 9,661,029 B2
(45) Date of Patent: May 23, 2017

(54) WIRELESS PEER-TO-PEER NETWORK TOPOLOGY

(75) Inventors: Osama Lotfallah, King of Prussia, PA (US); Milan Patel, Harrow (GB); Xavier De Foy, Kirkland (CA); Debashish Purkayastha, Collegeville, PA (US); Hang Liu, Yardley, PA (US); Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 93 days.

(21) Appl. No.: 13/439,982

(22) Filed: Apr. 5, 2012

(65) Prior Publication Data

US 2012/0281621 A1 Nov. 8, 2012

Related U.S. Application Data

(60) Provisional application No. 61/471,926, filed on Apr. 5, 2011.

(51) Int. Cl.
*H04L 29/06* (2006.01)
*H04W 4/00* (2009.01)
(Continued)

(52) U.S. Cl.
CPC ........ *H04L 65/1016* (2013.01); *H04L 12/145* (2013.01); *H04L 65/80* (2013.01);
(Continued)

(58) Field of Classification Search
CPC ... G06F 2/0481; G06F 3/0481; G06Q 3/0601; G06Q 50/01; G09B 15/00; G10H 1/0025;
(Continued)

(56) References Cited

U.S. PATENT DOCUMENTS

2004/0139088 A1* 7/2004 Mandato ............. H04L 12/5695
2005/0060411 A1* 3/2005 Coulombe ............. H04L 29/06
709/227
(Continued)

OTHER PUBLICATIONS

3rd Generation Partnership Project, TR 22.906 V1.0.0, "3rd Generation Partnership Project; Technical Specification Group Services and System Aspects; Study on IMS based Peer-to-Peer Content Distribution Services; (Release 10)", Feb. 2010, 14 pages.
(Continued)

*Primary Examiner* — Chirag Shah
*Assistant Examiner* — Jael Ulysse
(74) *Attorney, Agent, or Firm* — Condo Roccia Koptiw LLP

(57) ABSTRACT

A method and apparatus for generating a topology for wireless peer-to-peer (P2P) networks. A network architecture comprises a traffic optimization service including a traffic optimization server and an adaptor to effect bi-directional translation of a request-response protocol of the traffic optimization service and a signaling protocol of a multimedia network. The traffic optimization server stores information related to wireless communication systems comprising user/location id information including cache proxies, media gateways, and network peers of multiple access networks and cost metric information including maximum bit rate, guaranteed bit rate, storage capacity, CPU capabilities, number of clients serving, battery capabilities, reliability of path, and supported video/audio codec.

15 Claims, 13 Drawing Sheets

(51) Int. Cl.
*H04L 12/14* (2006.01)
*H04L 12/24* (2006.01)
*H04W 4/02* (2009.01)
*H04W 92/18* (2009.01)

(52) U.S. Cl.
CPC ........... *H04L 41/0896* (2013.01); *H04W 4/02* (2013.01); *H04W 92/18* (2013.01)

(58) Field of Classification Search
CPC ........ G10H 2210/125; G10H 2220/111; H04L 12/145; H04L 41/0896; H04L 65/1016; H04L 65/1069; H04W 4/02; H04W 92/18
See application file for complete search history.

(56) References Cited

U.S. PATENT DOCUMENTS

| | | | |
|---|---|---|---|
| 2005/0233728 A1 | 10/2005 | Karaoguz et al. | |
| 2006/0291412 A1* | 12/2006 | Naqvi | H04M 7/123 370/328 |
| 2007/0097885 A1* | 5/2007 | Traversat | G06F 9/4416 370/254 |
| 2007/0213078 A1* | 9/2007 | Shaheen | 455/466 |
| 2007/0237139 A1* | 10/2007 | Garcia-Martin | H04L 29/06027 370/389 |
| 2008/0101253 A1* | 5/2008 | Shvodian | 370/252 |
| 2009/0017797 A1* | 1/2009 | Li | H04L 67/104 455/414.1 |
| 2009/0017844 A1* | 1/2009 | Li | H04W 68/00 455/458 |
| 2009/0257351 A1* | 10/2009 | Hande | H04L 12/5695 370/236 |
| 2010/0208698 A1* | 8/2010 | Lu et al. | 370/331 |
| 2010/0299433 A1* | 11/2010 | De Boer | H04L 12/5695 709/224 |
| 2011/0202651 A1* | 8/2011 | Hilt | H04L 67/1072 709/224 |
| 2011/0252151 A1* | 10/2011 | Lu | H04W 80/045 709/228 |
| 2011/0302289 A1* | 12/2011 | Shaikh | H04L 29/12216 709/223 |
| 2012/0082158 A1* | 4/2012 | Reddy | H04W 80/045 370/389 |
| 2013/0212166 A1* | 8/2013 | Willig et al. | 709/203 |

OTHER PUBLICATIONS

3rd Generation Partnership Project, TR 23.829 V1.0.0, "3rd Generation Partnership Project; Technical Specification Group Services and System Aspects; Local IP Access and Selected IP Traffic Offload (Release 10)", Mar. 2010, 37 pages.

3rd Generation Partnership Project, TR 23.861 V1.0.0, "3rd Generation Partnership Project; Technical Specification Group Services and System Aspects; Multi access PDN connectivity and IP flow mobility (Release 9)", Mar. 2009, 34 pages.

Adjie-Winoto et al., "The design and implementation of an intentional naming system", 17th ACM Symposium on Operating Systems Principles (SOSP), Published as Operating Systems Review, Dec. 1999, 34(5), 186-201.

Aggarwal et al., "Can ISPs and P2P systems co-operate for improved performance?", ACM SIGCOMM Computer Communications Review (CCR), Jul. 2007, 37(3), 31-40.

Alimi et al., "ALTO Protocol (draft-ietf-alto-protocol-06.txt)", ALTO WG, Internet-Draft, Oct. 25, 2010, 1-66.

Buyya et al., "Content Delivery Networks", Lecture Notes in Electrical Engineering (LNEE), Springer, Aug. 14, 2008, vol. 9, 1-418 (Submitted with IDS: Summary, Table of Contents and Book Chapter Power Point Slides obtained from http://www.cloudbus.org/cdn/book/#intro).

Cisco, "CISCO SCE 8000 Series Service Control Engine: Cisco Service Control Application for Mobile Networks", accessed Mar. 7, 2012, 8 pages.

European Telecommunications Standards Institute (ETSI), TR 182 010 V3.1.1, "Telecommunications and Internet converged Services and Protocols for Advanced Networking (TISPAN); Peer-to-peer for content delivery for IPTV services: analysis of mechanisms and NGN impacts", Feb. 2010, 53 pages.

Hasslinger, G., "Peer-to-Peer Overlay Networks", Networks 2008, Budapest, Sep. 28-Oct. 2, 2008, 1-13.

Mghazli et al., "ALTO in Mobile Core (draft-randriamasy-alto-mobile-core-01)", Network Working Group, Internet-Draft, Oct. 23, 2010, 1-13.

Randriamasy, S., "Multi-Cost ALTO (draft-randriamasy-alto-multi-cost-00)", Network Working Group, Internet-Draft, Oct. 15, 2010, 1-17.

Rimac et al., "A Survey on Research on the Application-Layer Traffic Optimization (ALTO) Problem", Internet Research Task Force (IRTF), Oct. 2010, RFC: 6029, 1-20.

Seedorf et al., "Application-Layer Traffic Optimization (ALTO) Problem Statement", Network Working Group, Oct. 2009, RFC: 5693, 1-15.

* cited by examiner

WIRELESS PEER-TO-PEER NETWORK TOPOLOGY

CROSS REFERENCE TO RELATED APPLICATIONS

This application claims the benefit of U.S. Provisional Application No. 61/471,926, filed Apr. 5, 2011, which is incorporated by reference as if fully set forth herein.

BACKGROUND

Multimedia applications over wired and wireless networks are growing rapidly. End users demand rich multimedia applications regardless of the fact that multimedia content requires huge resources from the underlying network. Centralized media servers require considerable demands towards the bandwidth of the backbone IP network. As a solution to this, network operators may get involved in content delivery by placing caches and stream replicators in the operator network; called Network Peer. For example, some network operators may elect to perform caching of some multimedia content within the WLAN access point to serve some local users within the reach of the WLAN connection. However, the network operators may experience data traffic issues as the network architecture may not provide for peer-to-peer networks and may not provide for a traffic optimization service.

SUMMARY

Embodiments provide methods and apparatuses for generating a topology for wireless peer-to-peer (P2P) networks. For an embodiment, a network architecture may comprise a traffic optimization service including a traffic optimization server and an adaptor to effect bi-directional translation of a request-response protocol of the traffic optimization service and a signaling protocol of a multimedia network.

For an embodiment an application layer traffic optimization (ALTO) server stores information related to wireless communication systems comprising user/location id information including cache proxies, media gateways, and network peers of multiple access networks and cost metric information including maximum bit rate, guaranteed bit rate, storage capacity, CPU capabilities, number of clients serving, battery capabilities, reliability of path, and supported video/audio codec.

In an embodiment, a method may be used to provide traffic optimization for an IP multimedia subsystem (IMS). This may be done, for example, to assist a network peer in finding another network peer. A signaling message may be received from a first network peer in a signaling protocol. The signaling message may be received via an IMS core network subsystem. The signaling message may comprise traffic optimization information and a peer information request. Traffic optimization information and peer request information may be extracted from the signaling message using the signaling protocol. The traffic optimization information and the peer information request may be transmitted to a traffic optimization server using a request-response protocol that may be understood by the traffic optimization server. A traffic optimization message may be received from the traffic optimization server in the request-response protocol. The traffic optimization message may include the identity of the second network peer. The traffic optimization message may be transmitted to the first network peer in the signaling protocol.

In another embodiment, a method may be used to provide traffic optimization for an IP multimedia subsystem (IMS). This may be done, for example, to assist a network peer in finding another network peer. A signaling message may be received from the first network peer in a signaling protocol. The signaling message may be received via, for example, an IMS core network subsystem. The signaling message may include traffic optimization information that may be used to update a traffic optimization server. The traffic optimization information may be extracted from the signaling message using the signaling protocol. The traffic optimization information may be transmitted to the traffic optimization server using a request-response protocol that may be understood by the traffic optimization server. An acknowledgement message may be received from the traffic optimization server in the request-response protocol. The acknowledgement message may notify the first network peer that the traffic optimization server has been updated. The acknowledgment message may be transmitted to the first network peer in the signaling protocol.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1A:
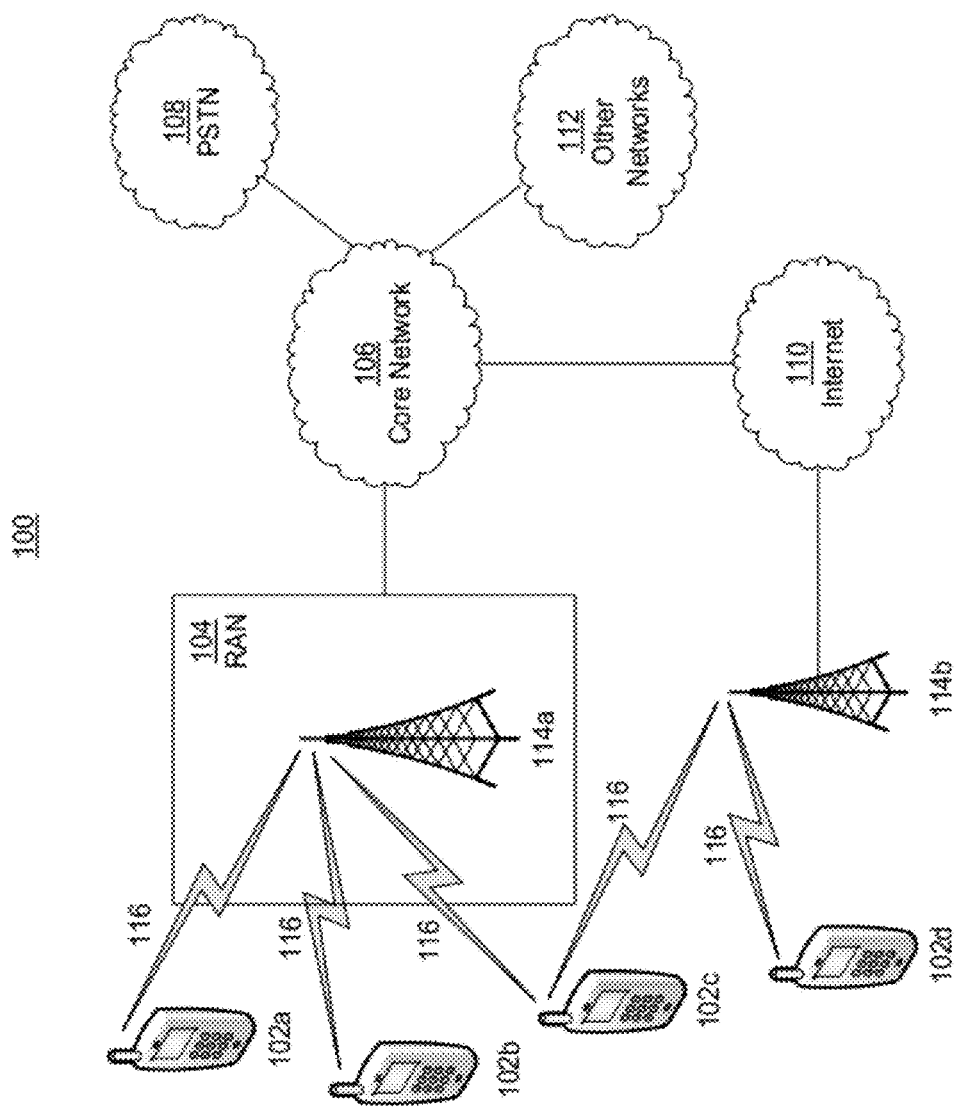
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
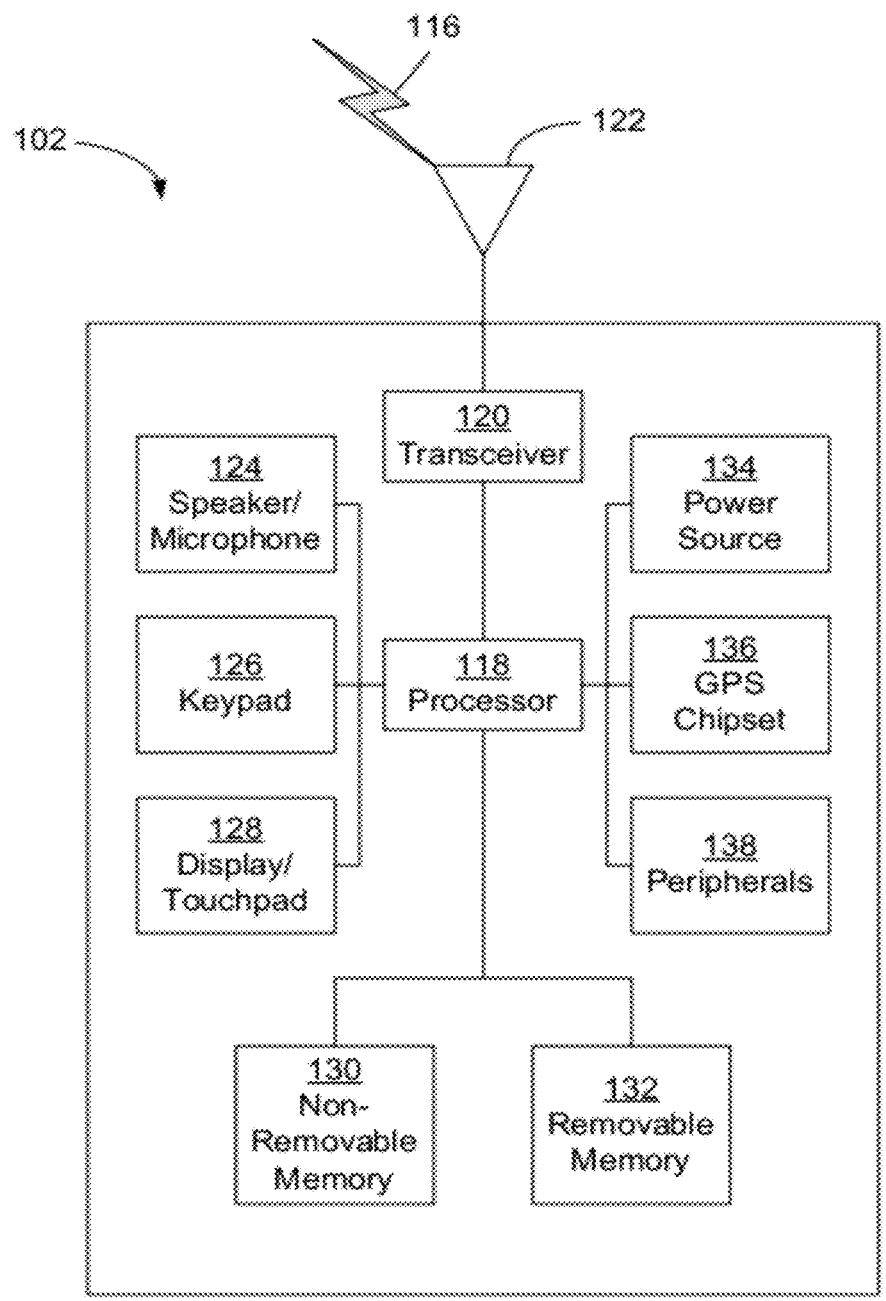
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
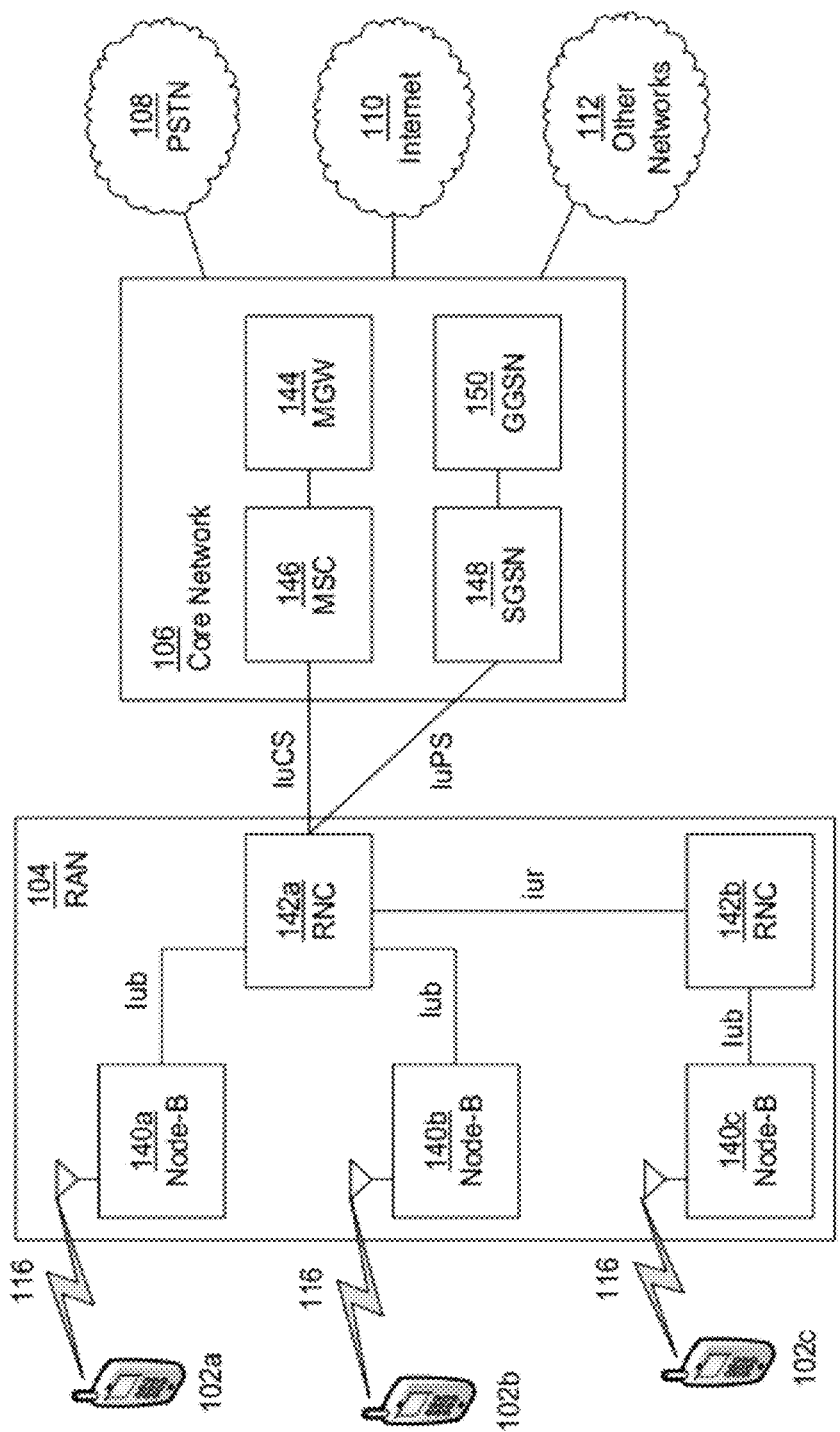
FIG. 1C is a system diagram of an example radio access network and an example core network that may be used within the communications system illustrated in FIG. 1A.

FIG. 1C is a system diagram of the RAN 104 and the core network 106a according to an embodiment. As noted above, the RAN 104 may employ a UTRA radio technology to communicate with the WTRUs 102a, 102b, 102c over the air interface 116. The RAN 104 may also be in communication with the core network 106a. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106a, it will be appreciated that any one of these elements may be owned and/or operated by an entity other than the core network operator.

The RNC 142a in the RAN 104 may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
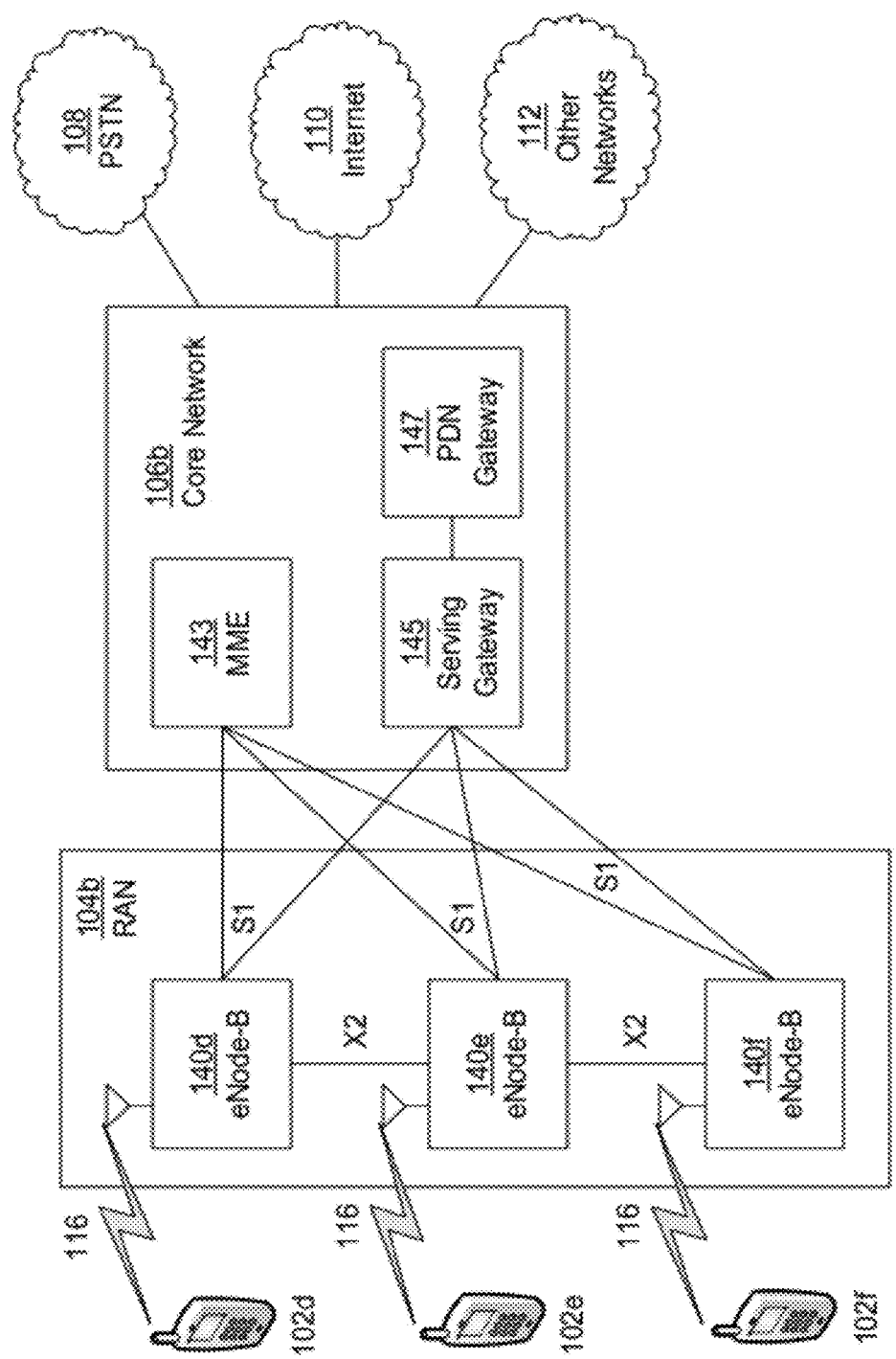
FIG. 1D depicts a system diagram of an example radio access network and an example core network that may be used within the communications system illustrated in FIG. 1A.

FIG. 1D is a system diagram of the RAN 104b and the core network 106b according to an embodiment. As noted above, the RAN 104b may employ an E-UTRA radio technology to communicate with the WTRUs 102d, 102e, 102f over the air interface 116. The RAN 104 may also be in communication with the core network 106b.

The RAN 104 may include eNode-Bs 140d, 140e, 140f, though it will be appreciated that the RAN 104 may include any number of eNode-Bs while remaining consistent with an embodiment. The eNode-Bs 140d, 140e, 140f may each include one or more transceivers for communicating with the WTRUs 102d, 102e, 102f over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102d.

Each of the eNode-Bs 140d, 140e, 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements are depicted as part of the core network 106b, it will be appreciated that any one of these elements may be owned and/or operated by an entity other than the core network operator.

The MME 143 may be connected to each of the eNode-Bs 140d, 140e, 140f in the RAN 104b via an S1 interface and may serve as a control node. For example, the MME 143 may be responsible for authenticating users of the WTRUs 102d, 102e, 102f, bearer activation/deactivation, selecting a particular serving gateway during an initial attach of the WTRUs 102d, 102e, 102f, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102d, 102e, 102f. The serving gateway 145 may also perform other functions, such as anchoring user planes during inter-eNode B handovers, triggering paging when downlink data is available for the WTRUs 102d, 102e, 102f, managing and storing contexts of the WTRUs 102d, 102e, 102f, and the like.

The serving gateway 145 may also be connected to the PDN gateway 147, which may provide the WTRUs 102d, 102e, 102f with access to packet-switched networks, such as the Internet 110, to facilitate communications between the WTRUs 102d, 102e, 102f and IP-enabled devices.

The core network 106b may facilitate communications with other networks. For example, the core network 106b may provide the WTRUs 102d, 102e, 102f with access to circuit-switched networks, such as the PSTN 108, to facilitate communications between the WTRUs 102d, 102e, 102f and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102d, 102e, 102f with access to the networks 112, which may include other wired or wireless networks that are owned and/or operated by other service providers.

Figure 1E:
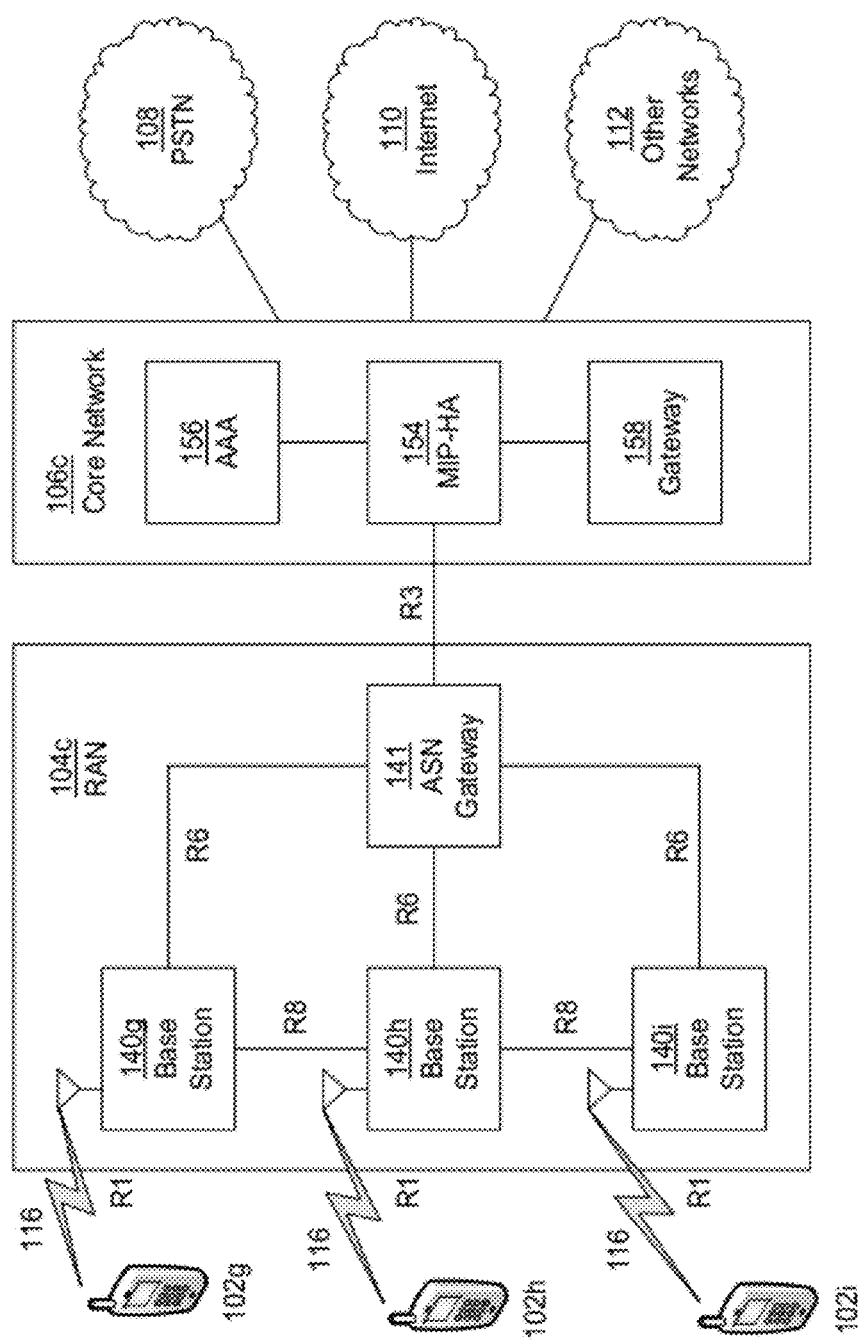
FIG. 1E depicts a system diagram of an example radio access network and an example core network that may be used within the communications system illustrated in FIG. 1A.

FIG. 1E is a system diagram of the RAN 104c and the core network 106c according to an embodiment. The RAN 104c may be an access service network (ASN) that employs IEEE 802.16 radio technology to communicate with the WTRUs 102g, 102h, 102i over the air interface 116. As will be further discussed below, the communication links between the different functional entities of the WTRUs 102g, 102h, 102i, the RAN 104c, and the core network 106c may be defined as reference points.

As shown in FIG. 1E, the RAN 104c may include base stations 140g, 140h, 140i, and an ASN gateway 141, though it will be appreciated that the RAN 104 may include any number of base stations and ASN gateways while remaining consistent with an embodiment. The base stations 140g, 140h, 140i may each be associated with a particular cell (not shown) in the RAN 104c and may each include one or more transceivers for communicating with the WTRUs 102g, 102h, 102i over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102g. The base stations 140g, 140h, 140i may also provide mobility management functions, such as handoff triggering, tunnel establishment, radio resource management, traffic classification, quality of service (QoS) policy enforcement, and the like. The ASN Gateway 141 may serve as a traffic aggregation point and may be responsible for paging, caching of subscriber profiles, routing to the core network 106c, and the like.

The air interface 116 between the WTRUs 102g, 102h, 102i and the RAN 104c may be defined as an R1 reference point that implements the IEEE 802.16 specification. In addition, each of the WTRUs 102g, 102h, 102i may establish a logical interface (not shown) with the core network 106c. The logical interface between the WTRUs 102g, 102h, 102i and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102g, 102h, 100i.

As shown in FIG. 1E, the RAN 104 may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements are depicted as part of the core network 106c, it will be appreciated that any one of these elements may be owned and/or operated by an entity other than the core network operator.

The MIP-HA may be responsible for IP address management, and may enable the WTRUs 102g, 102h, 102i to roam between different ASNs and/or different core networks. The MIP-HA 154 may provide the WTRUs 102g, 102h, 102i with access to packet-switched networks, such as the Internet 110, to facilitate communications between the WTRUs 102g, 102h, 102i and IP-enabled devices. The AAA server 156 may be responsible for user authentication and for supporting user services. The gateway 158 may facilitate interworking with other networks. For example, the gateway 158 may provide the WTRUs 102g, 102h, 102i with access to circuit-switched networks, such as the PSTN 108, to facilitate communications between the WTRUs 102g, 102h, 102i and traditional landline communications devices. In addition, the gateway 158 may provide the WTRUs 102g, 102h, 102i with access to the networks 112, which may include other wired or wireless networks that are owned and/or operated by other service providers.

Although not shown in FIG. 1E, it will be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102g, 102h, 102i between the RAN 104c and the other ASNs. The communication link between the core network 106c and the other core networks may be defined as an R5 reference, which may include protocols for facilitating interworking between home core networks and visited core networks.

In an embodiment, a method may be used for providing traffic optimization for an IP-multimedia subsystem (IMS). This may be done, for example, to assist a first network peer in finding a second network peer. The first network peer may be a wireless transmit/receive unit. A signaling message may be received, via an IMS core network subsystem, from the first network peer in a signaling protocol. The signaling protocol may be a session initiation protocol (SIP), for example. The signaling message may include traffic optimization information and a peer information request. The traffic optimization information may include a maximum bit rate, a guaranteed bit rate, storage capacity, CPU capabilities, a number of clients serving, battery capabilities, a reliability of path, a supported video/audio codec, or the like. The traffic optimization information may also include network locations and cost values for paths between a source network location and a destination network location.

The traffic optimization information and the peer information request may be extracted from the signaling message using the signaling protocol. The traffic optimization information and the peer information request may be transmitted to a traffic optimization server using a request-response protocol understood by the traffic optimization server. The traffic optimization server may be an Application Layer Traffic Optimization (ALTO) server, for example. A traffic optimization message may be received from the traffic optimization server in the request-response protocol. The request-response protocol may be a hypertext transfer protocol (HTTP), for example. The traffic optimization message may include an identity of the second network peer. The traffic optimization message may be transmitted to the first network peer in the signaling protocol.

In an embodiment, a method may be used for providing traffic optimization for an IP-multimedia subsystem (IMS). This may be done, for example, to assist a first network peer in finding a second network peer. A signaling message may be received, via an IMS core network subsystem, from the first network peer in a signaling protocol. The signaling protocol may be a session initiation protocol (SIP). The signaling message may include traffic optimization information to update a traffic optimization server. The traffic optimization server may be an Application Layer Traffic Optimization (ALTO) server. The traffic optimization information may include network locations and cost values for paths between a source network location and a destination network location. The traffic optimization information may include a cost map that defines costs to use at least one path of a network. The traffic optimization information may information collected from a home subscriber server (HSS), a policy and charging rules function (PCRF), an access network discovery and selection function (ANDSF), or the like. The traffic optimization information may include a maximum bit rate, a guaranteed bit rate, a storage capacity, CPU capabilities, a number of clients serving, battery capabilities, a reliability of path, a supported video/audio codec, or the like.

The traffic optimization information may be extracted from the signaling message using the signaling protocol. The traffic optimization information may be transmitted to the traffic optimization server using a request-response protocol understood by the traffic optimization server. The request-response protocol may be a hypertext transfer protocol (HTTP), for example. An acknowledgement message may be received from the traffic optimization server in the request-response protocol. The acknowledgement message may notify the first network peer that the traffic optimization server has been updated. The acknowledgement message may be transmitted to the first network peer in the signaling protocol.

In an embodiment, a wireless transmit/receive unit (WTRU) may provide traffic optimization information for a traffic optimization service in an IP multimedia subsystem (IMS). This may be done, for example, to assist the WTRU in finding a network peer. A processor belonging to the WTRU may be configured to retrieve the traffic optimization information from a home subscriber server (HSS), a policy and charging rules function (PCRF), or an access network discovery and selection function (ANDSF). A transceiver of the WTRU may be configured to transmit a signaling message to an IMS core network subsystem in a signaling protocol to update a traffic optimization server. The signaling message may include the traffic optimization information. The transceiver may also receive an acknowledgement message in the signaling protocol. The acknowledgement message may notify the WTRU that a database of the traffic optimization server has been updated.

Figure 2:
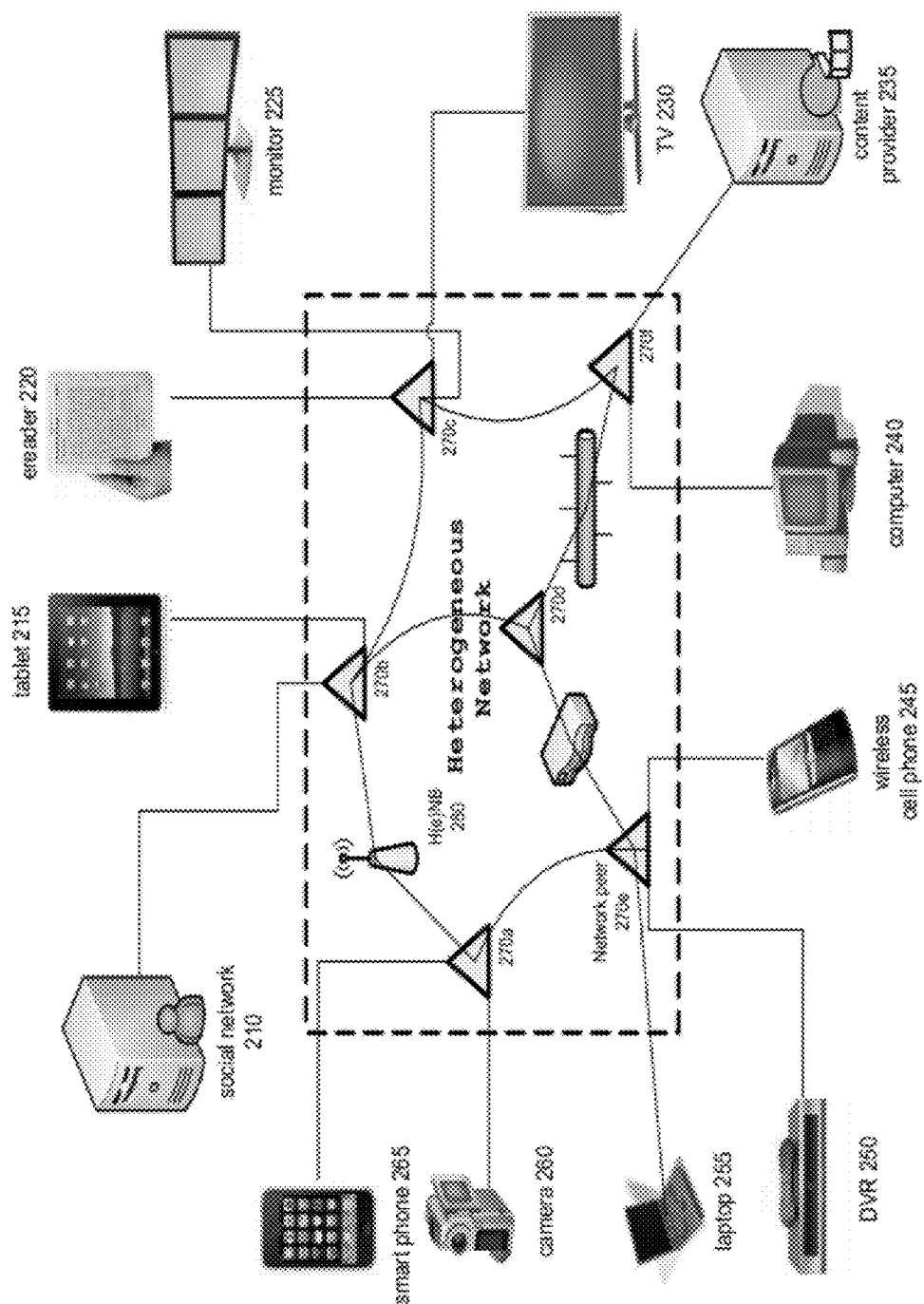
FIG. 2 illustrates an example of a wireless network.

FIG. 2 illustrates a network for communicating multimedia applications over wired and wireless networks. Providing multimedia content may use extensive resources of the underlying network to satisfy end-user demands for multimedia applications. Additionally, centralized media servers may make considerable demands on the bandwidth of the backbone IP network. To address these demands, network operators may get involved in the actual content delivery by placing caches and stream replicators in the operator network as close as possible to end-users, which may be referred to as a Network Peer.

As shown in FIG. 2, Network Peers, such as Network Peer 270a, 270b, 270c, 270d, 2703, and 270f, may be deployed and controlled by operators/service providers. For example, Network Peer 270a and Network Peer 270f may be connected to Home e-NodeB (H(e)NB) 280 and may be controlled by an operator or service provider. Network Peers may also interface with cache servers deployed by other operators or service providers.

The Network Peers, such as Network Peer 270a, may by operatively connected to one or more devices or services, such as social network 210, tablet 215, eReader 220, monitor 225, television (TV) 230, content provider 235, computer 240, wireless cell phone 245, digital video recorder (DVR) 250, laptop 255, camera 260, smart phone 265, or the like. For example, Network Peer 270e may be operatively connected to the wireless network that serves wireless cell phone 245 and may also be operatively connected to a WiFi network that serves laptop 255. The Network Peers may also be operatively connected to each other. For example, Network Peer 270a may be connected to Network Peer 270e so that both devices may communicate. The Network Peers may be used to distribute content from one device or service to another device or service. For example, Network Peer 270a and 270f may be used to distribute content from content provider 235 to smart phone 265. Network Peer 270a and 270f may also be used to distribute content from smart phone 265 to content provider 235.

Network Peers may also allow different Internet Service Providers (ISP) to collaborate to share some of the content-delivery burden, such as burden created by some form of Content/Network Peering. The Network Peers may appear different than caching within Content Distribution Network (CDN) as the Network Peers may cache content regardless of the origin. CDN edge servers may also be used to enhance Network Peer functionality.

An ISP may elect to perform caching of some multimedia content within a WLAN access point to serve some local users within the reach of the WLAN connection. On the other hand, popular content may be cached in macro cell controllers (i.e. next level controllers). Content segmentation may be used with caching techniques to take care of content that may be popular in first few minutes of the content, but may not be popular in the last few minutes of the same movie. For example, caching techniques may be used to handle users that may have an initial interest in a movie, but drop off after watching a few minutes. This phenomenon may be referred to as "early drop of the view" and may occur where a user might pause or end watching a movie before it ends.

Figure 3:
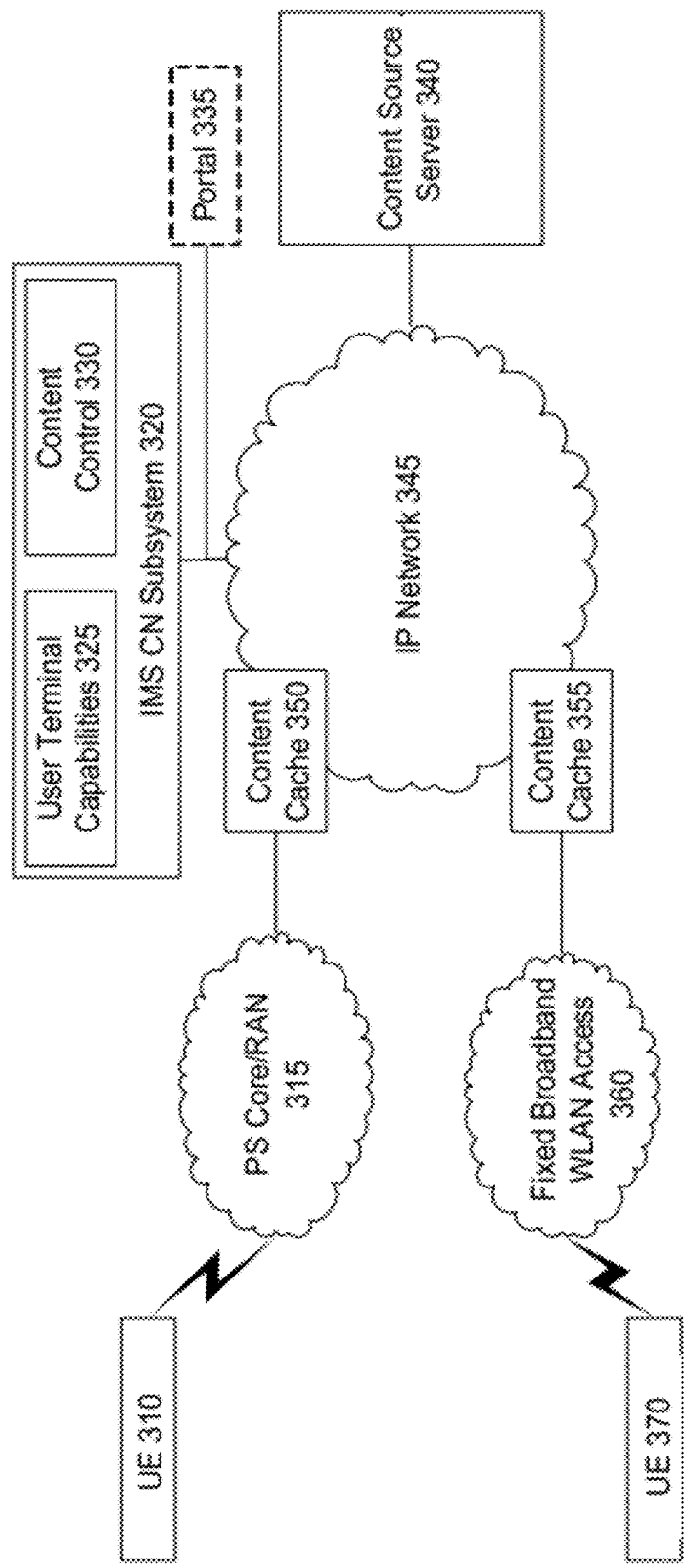
FIG. 3 illustrates an example of a P2P content distribution system.

FIG. 3 shows an example of P2P content distribution system. As shown in FIG. 3, a P2P content distribution system may include one or more UEs that may be able to use an IP multimedia Subsystem (IMS), such as UE 310 and UE 370. The UEs may be able to communicate with IP Network 345, through a Packet Switched (PS) Core, a RAN, a fixed Broadband WLAN Access, or the like. For example, UE 310 may communicate with IP Network 345 via PS Core/RAN 315 and UE 370 may communicate with IP Network 345 via Fixed Broadband WLAN Access 360. IP Network 345 may be any network that handles IP address. For example, IP Network may be the Internet, an intranet, a WLAN, or the like.

IP Network 345 may be operatively connected to content cache 350, content cache 355, IMS Core Network (CN) subsystem 320, portal 335, content source server 340, or the like. Content cache 350 and content cache 355 may be content cache servers that cache media content. This may be done, for example, to off load data traffic from content source server 340. As an example, content cache 350 may cache content from content source server 340 and content cache 350 may provide the cached content to UE 310. Content source server 340 may be any server that provides, encodes, or saves content. For example, content source server 340 may be a social network, a webpage, Facebook, YouTube, or the like.

IP Network 345 may be operatively connected to IMS CN subsystem 320. IMS CN subsystem 320 may allow UEs, such as UE 310 and UE 370, to register on IMS. The IMS CN subsystem 320 may include user profile & terminal capabilities 325 and content control 330. User profile & terminal capabilities 325 may be a database that may store profiles for one or more UEs. User profile & terminal capabilities 325 may also store user information associated with one or more UEs and may store information regarding the capabilities of the one or more UEs. Content control 330 may include information regarding content sources, such as content source server 340, and may provide IMS CN subsystem 320 with the ability to control content on the IP Network 345. Content control 330 may also provide IMS CN subsystem 320 with the ability to control content sources, such as content source server 340.

As shown in FIG. 2, a UE may request multimedia content that may be cached and controlled by an ISP. For example, UE 310 may initiate a content distribution service via PS Core/RAN 315 by accessing a web portal, such as portal 335, that may include a database of available media content. Media content may be distributed to content caches that may be close to a UE or a UE associated with a user. For example, the media content may be distributed to content cache 350. User profile & Terminal Capabilities 325 may provide information regarding a user's preferences and terminal capabilities. This may be used to decide whether UE 310 may be capable of receiving the requested content. Content control 330 may be used to control how the content may be distributed in the network and where UE 310 may get the requested content.

P2P may be seen as a content-delivering application that runs over the top (OTT) of an operator network. Network operators may get involved in the actual content delivery by placing caches and stream replicators in the operator network. Different parties may collaborate to share some of the content-delivery burden. For P2P, streaming content segmentation may be required. Segmentation may be concerned with splitting Program A into different segments, and each peer may store some of those segments. Network Based Application Control (NBAC) may be based on extracting from the service traffic specific signals (e.g. content request, start, and stop) and sending them to the Resource and Admission Control Sub-System (RACS). In addition, handling peer management status info such as online/offline, available bandwidth and processing capacity may be an integral part of the overall P2P streaming.

Two related problems may arise when dealing with P2P streaming; object replica placement and peer selection. When dealing with a set of multimedia data objects and these objects may need to be distributed across the set of storage nodes, such as content cache node 350 shown with respect to FIG. 3. Clients, such as UE 310, may access some of these data objects using the set of storage nodes. Object replication may be addressed as a graph problem that approximates the overall performance of a certain metric (such as minimal storage cost, minimal user access latency or network bandwidth consumption). On the other hand, P2P clients may face the problem of selecting M peers for streaming multimedia objects from N (N>M) available peers. Disclosed herein are methods that may select M peers to optimize the usage of the underlying networking resources. The generation and distribution of topology related information may help in solving these problems.

Replica placement may be addressed as a graph problem. For example, given a network G with C clients and S server nodes, each client $c_i$ may have QoS constraints $d_i$ (latency, jitter, error rate, visual quality). Each server $s_j$ may have capacity constraints $l_j$. The smallest set of servers S' may be found such that QoS between any client $c_i$ and its "parent" server $s_{ci} \in$ S' may be bounded by $d_i$.

A static algorithm may be used to solve the graph problem. For example, a root server may have knowledge of the network and user requests such that $c_i$ and $d_i$ may be known ahead. This algorithm may be simple to implement when the number of users and replica servers are few and may not change over time.

A dynamic algorithm may also be used to solve the graph problem. For example, a client may start a daemon program that may be provided by content service provider. The program may estimate $d_i$ and may figure out the network topology. This may be used, for example, when $c_i$ and $d_i$ may vary over time.

A peer selection algorithm may be used to optimize P2P traffic. Some P2P systems may use application layer routing that may be based on an overlay topology on top of existing Internet. To construct an overlay topology, unstructured P2P networks may employ a random neighbor selection algorithm. The random selection of neighbors may provide a simple solution. However, the random selection of neighbors may lead to a suboptimal solution. For example, a node in Spain may download large multimedia object from a node in Mexico, while the same object may be available at a node in Germany. Rather than allowing the P2P node to choose neighbors independent, the ISP (or service providers) may offer a neighbor ranking service. The neighbor ranking service may represent a preference of an ISP for certain P2P neighbors. Such ranking may consider the geolocation proximity of neighbors as well as network latency and path congestion between neighbors. The ability to control/manage its traffic may be crucial to the operating costs of ISPs.

Replica placement and peer selection may be addressed using an understanding of proxy servers' capabilities and peer capabilities. Proxy server capabilities may include bandwidth, storage capacity, CPU load, number of clients serving, and neighboring cache proxies, while peers capabilities may include bandwidth, CPU load, battery capabilities, and neighboring cache proxies/peers.

Figure 4:
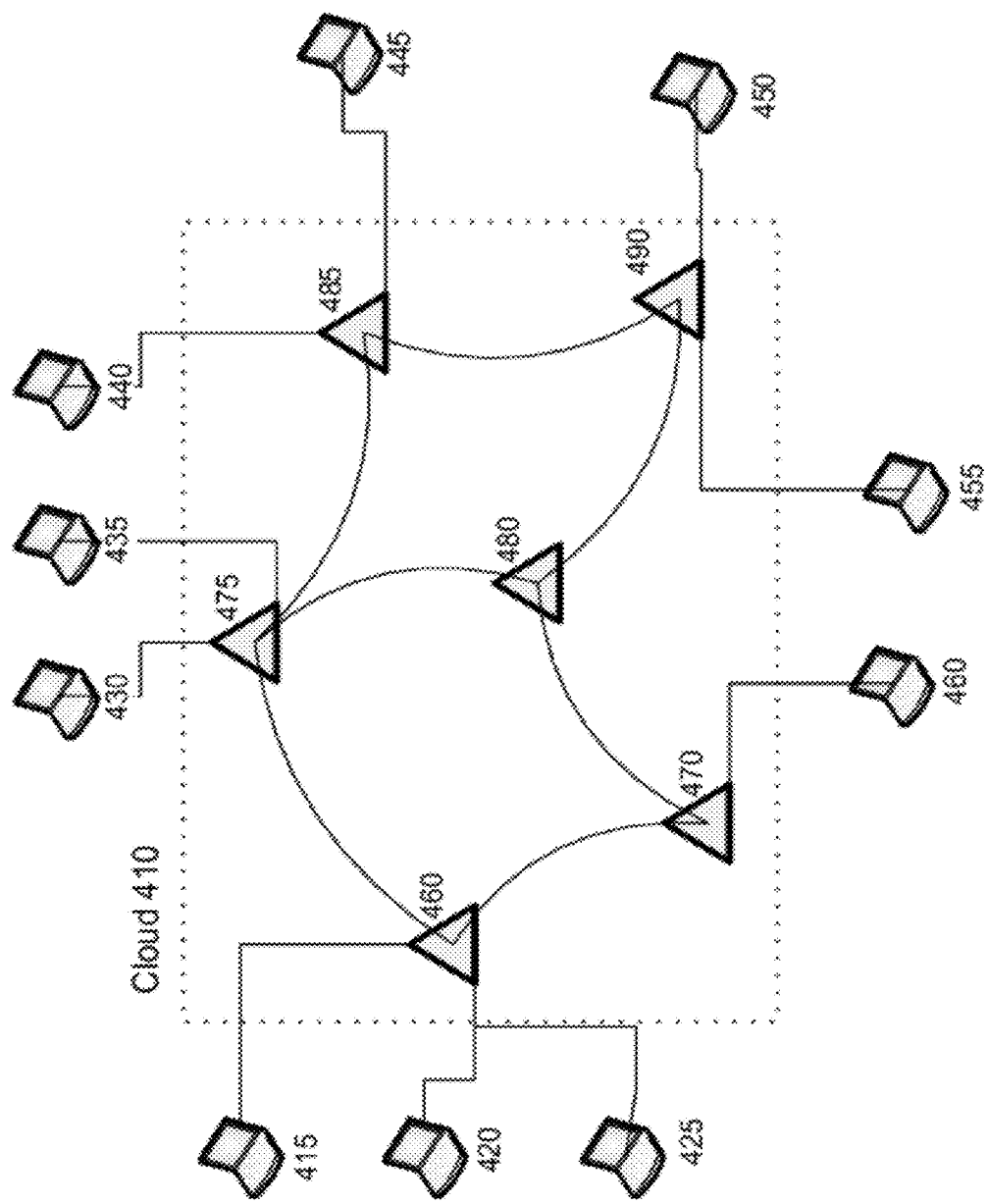
FIG. 4 illustrates an example of a topology of P2P overlay architecture.

Mobile core networks may present a high degree of topology change. FIG. 4 shows a sample topology of P2P overlay architecture that may be configured over heterogeneous networks (or cloud) and heterogeneous client capabilities.

As shown in FIG. 4, one or more terminals, such as terminal 415, 420, 425, 430, 435, 440, 445, 450, 455, and 460, may be operatively connected to cloud 410. Cloud 410 may allow the terminals to communicate with each other. For example, cloud 410 may allow terminal 415 to communicate with terminal 440. The terminals may be a computer, a phone, a cell phone, a eNode-B, a server, a smart phone, or the like. The cloud may be a network such as the Internet, an intranet, a WLAN, or the like. The cloud may include one or more network peers, such as network peer 465, 470, 475, 480, 485, and 490. The network peers may be operatively connected to each other and may be operatively connected to one or more terminals. For example, network peer 480 may be connected to network peer 470, 475, and 490. Network peer 490 may be connected to terminal 450 and 455.

An information-sharing service may be used to enable applications to perform better-than-random peer selection. For example, application layer traffic optimization (ALTO) may be a request/response protocol for querying an ALTO service to obtain information that may be useful for peer selection. The network location information within the proximity of the ALTO server as well as the cost metrics between the paths of these network locations may represent the main exchanged information within this protocol. ALTO for Media Streaming may help a peer to find effective communicating peers for exchanging media content. ALTO may also be useful for real-time application by helping peers find a better proxy. In addition, file sharing applications may benefit from the existence of an ALTO service by enabling clients to locate file servers that may be used to retrieve data efficiently.

Network location identifiers and multi-cost parameters for multi-path transfer may be used to facilitate ALTO transactions within a network, such as a mobile core network. For example, 3GPP user/location identification from a Home Location Register (HLR) and routing costs may be used to facilitate ALTO transactions.

The user/location id and cost metrics may be extended to include information pertinent to wireless communication systems. For example, the user/location id and cost metrics may be extended to include cache proxies, media gateways, and network peers of various access networks (3GPP, IMS, WiFi, WiMAX), or the like. The user/location id and cost metrics may also be extended to include performance related metrics such as maximum bit rate, guaranteed bit rate, storage capacity, CPU capabilities, number of clients serving, battery capabilities, reliability of path (on larger scale), supported video/audio code, or the like. Additionally, embodiments may include deployment scenarios within a 3GPP IMS P2P framework, where a proxy application server may be used to translate HTTP messages to session initiation protocol (SIP) messages between an ALTO server and an IMS core network. Embodiments may also include ALTO agents deployed in network elements to collect information to be used to populate an ALTO server database.

Figure 5:
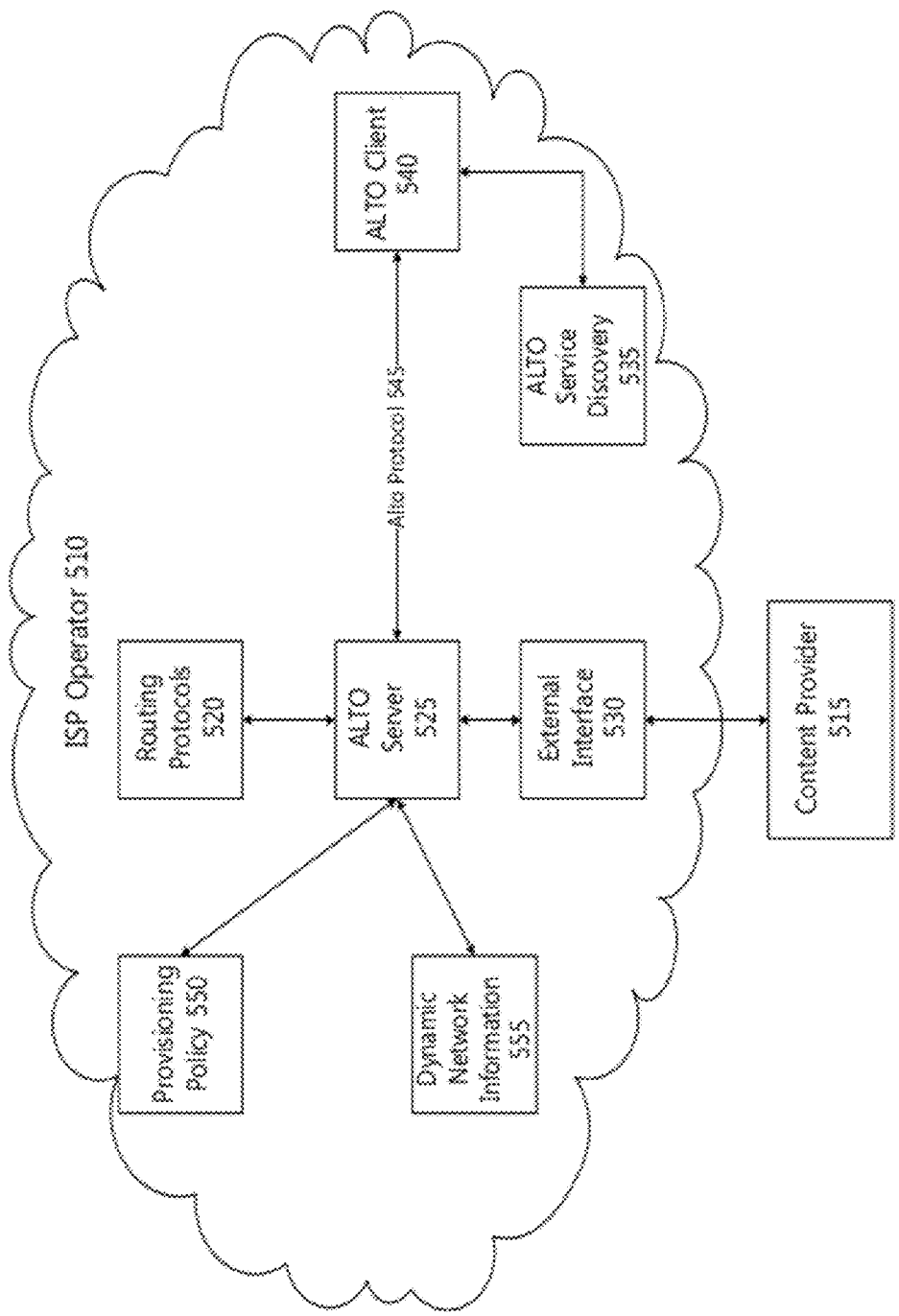
FIG. 5 illustrates an example of an ALTO architecture component.

FIG. 5 shows an example ALTO architecture. This architecture may be used, for example, to allow a UE associated with an ALTO client to receive content from a content provider.

As shown in FIG. 5, content provider 515 may communicate with ISP/Operator 510 via, for example, external interface 530. The content provider may be a website, a social network, a database, or the like. External interface 530 may be a html interface, a SIP interface, or the like. The ISP/Operator 510 may include and/or operate external interface 530, ALTO server 525, dynamic network information 555, provisioning policy 550, routing protocol 520, alto client 540, and alto service discovery 535.

When a UE requests content from a content provider, such as content provider 515, ALTO server may optimize data traffic to and from the content provider. In optimizing the data traffic, the ALTO server 525 may receive a request from ALTO client 540 via ALTO Protocol 545. The ALTO client 540 may be associated with a UE. The ALTO client 540 may be located on the UE or may be external to the UE. The ALTO client 540 may allow the UE to communicate with the ALTO server 525, for example, to coordinate the optimal retrieval of data from content provider 515.

To transmit a request or to communicate with ALTO server 525, ALTO client 540 may retrieve the identity of an ALTO server from ALTO service discovery 535. ALTO service discovery 535 may be a database or program that may include the identity of one or more ALTO servers. ALTO service discovery 535 may receive a request from ALTO client 540 to identify an ALTO server. ALTO service discovery 535 may identify an ALTO server that may be near the ALTO client 540. For example, ALTO service discovery 535 may identity an ALTO server that may be geographically close to ALTO client 540. As another example, ALTO service discovery 535 may identify an ALTO server that may have the lowest network latency time, such as a response time, with regard ALTO client 540.

ALTO Server 525 may receive a request for content from ALTO client 540 and may forward the request to content provider 515 via external interface 530. ALTO server 525 may be operatively connected to routing protocols 520, provisioning policy 550, and dynamic network information 555. Routing protocols 520 may provide ALTO server 525 with protocols that may be used to operate within ISP/Operator 510. Provisioning Policy 550 may provide ALTO server 525 with policy as to how data should be provisioned among content providers, neighborhood peers, alto client, UEs, or the like. Dynamic network information 555 may provide ALTO server 525 with information concerning a network.

ALTO information may be influenced by other systems such as static network configuration databases, dynamic network information, routing protocols, provisioning policies, and interfaces to outside parties. Server information service may carry operations and cost metrics supported by the ALTO server. ALTO Information Services may carry a network map and cost map (for paths between network locations), query results filtered by ALTO Server, look up properties for individual endpoints, or the like. For example, ALTO information services may query for costs and rankings based on endpoints. ALTO Request/response messages may be transmitted using HTTP. The ALTO server may be discovered using DNS.

For 3GPP, mobile core networks may be smaller than ISP Core networks in terms of its topology. On the other hand, they may have a higher degree of topology change in terms of their connections to end nodes. In other words, network maps and cost maps for mobile core networks may change more frequently than ISP Core networks. Network location ID may be assigned based on IP addresses of mobile peers or it may be assigned based on 3GPP identifications extracted from Host Location Register and Visitor Location Register (HLR/VLR) for legacy systems or extracted from Home Subscriber Server (HSS) for IMS based systems.

Embodiments described herein may enhance existing wireless capabilities to include appropriate network location service with associated cost metrics, which may help in creating a wireless overlay topology between cache proxies, media gateways, network peers, and end users. Performance related metrics may be defined to help in determining a cache proxy, application server, or end user peers.

Additional properties to network location information may also be defined for mobile proxy/end users and additional properties to path cost information for mobile proxy/end users. Protocol message extensions to ALTO may also be defined that may include IMS P2P Network peers, IMS end users, Non-IMS end users, various wireless access networks, or the like.

Embodiments described herein may identify new interfaces for network/cost services to be included in various architectures (e.g., a 3GPP architecture), and may identify new interfaces for network/cost services to be used between different wireless access networks and cross multiple network operators.

Embodiments described herein disclose an ALTO adaptor that may be used to perform bi-directional message translation between HTTP that may be used by the ALTO server and an underlying wireless access specific protocol that may be used for wireless deployment. An ALTO agent may be used at the network peer level to collect information from UEs and other network peers and provide them to ALTO servers. The ALTO agent may be used with IMS and non-IMS networks.

An ALTO service may be used in a heterogeneous wireless network. For example, an ALTO service, such as an ALTO client, an ALTO server and/or an ALTO agent may be implemented within IMS architecture. This may be accomplished, for example, by adding an ALTO SIP adaptor between the IMS UEs or network peers and implementing an ALTO server that may provide message translation between ALTO HTTP request/response messages and IMS SIP messages. This SIP adaptor may use SIP OPTIONS/NOTIFY/INFO message to query capabilities of proxy servers and media gateways within the proximity of such adaptor. Other SIP messages may be used as well as protocols other than IMS.

An interface may be implemented between the ALTO server and a Home Subscriber Server (HSS) to query peer ID, subscription, and capabilities that may be used as network location id. This interface may be used to populate the ALTO server with similar information to dynamic network information as shown in FIG. 5. The interface may use SIP PUBLISH/NOTIFY/INFO messages to add, modify or delete network location id in the ALTO server database. Alternatively, other protocols (e.g., Diameter) may be used.

A new interface may be implemented between an ALTO server and a Policy and Charging Rules Function (PCRF) for populating provisioning policy information as shown in FIG. 5.

ALTO services may be extended to enable the generation of network maps and cost maps for various mobile networks that may be run by different operators. ALTO service may also be extended to enable interaction between these different mobile networks and other ISP core networks. For example, the underlying access networks may be WiFi, WiMAX, or 3GPP. The scope of ALTO queries may be extended to include cases where queries may be targeting a particular access network as well as queries targeting some or all available access networks. Network location identifiers may be extended to include cases of the same network id regardless of underlying access networks and cases of multiple network ids for each access network. An interface may also be implemented between the ALTO server and the Access Network Discovery and Selection Function (ANDSF) that may access management objects and relevant parameters for intersystem mobility policy.

Cost metrics that may be queried by P2P clients may be extended to include, access technologies, routing cost, hop count, maximum bit rate, guaranteed bit rate, storage capacity, CPU capabilities, number of clients serving, battery capabilities, reliability of path (on larger scale), supported video/audio codec, or the like. Embodiments may also allow a short lifetime of queries to mobile end users (short time-to-expire counter), may normalize cost metrics that may be queried by UEs attached to multiple wireless interface (e.g., WiFi, WiMAX, 3GPP), and may allow clients and content control components to effect optimization over multiple cost metrics.

An ALTO agent may be attached to Network Peers or border gateways to populate the ALTO servers with cost related information between candidate network locations. This information may be extracted using deep packet inspection or using third party services.

Figure 6:
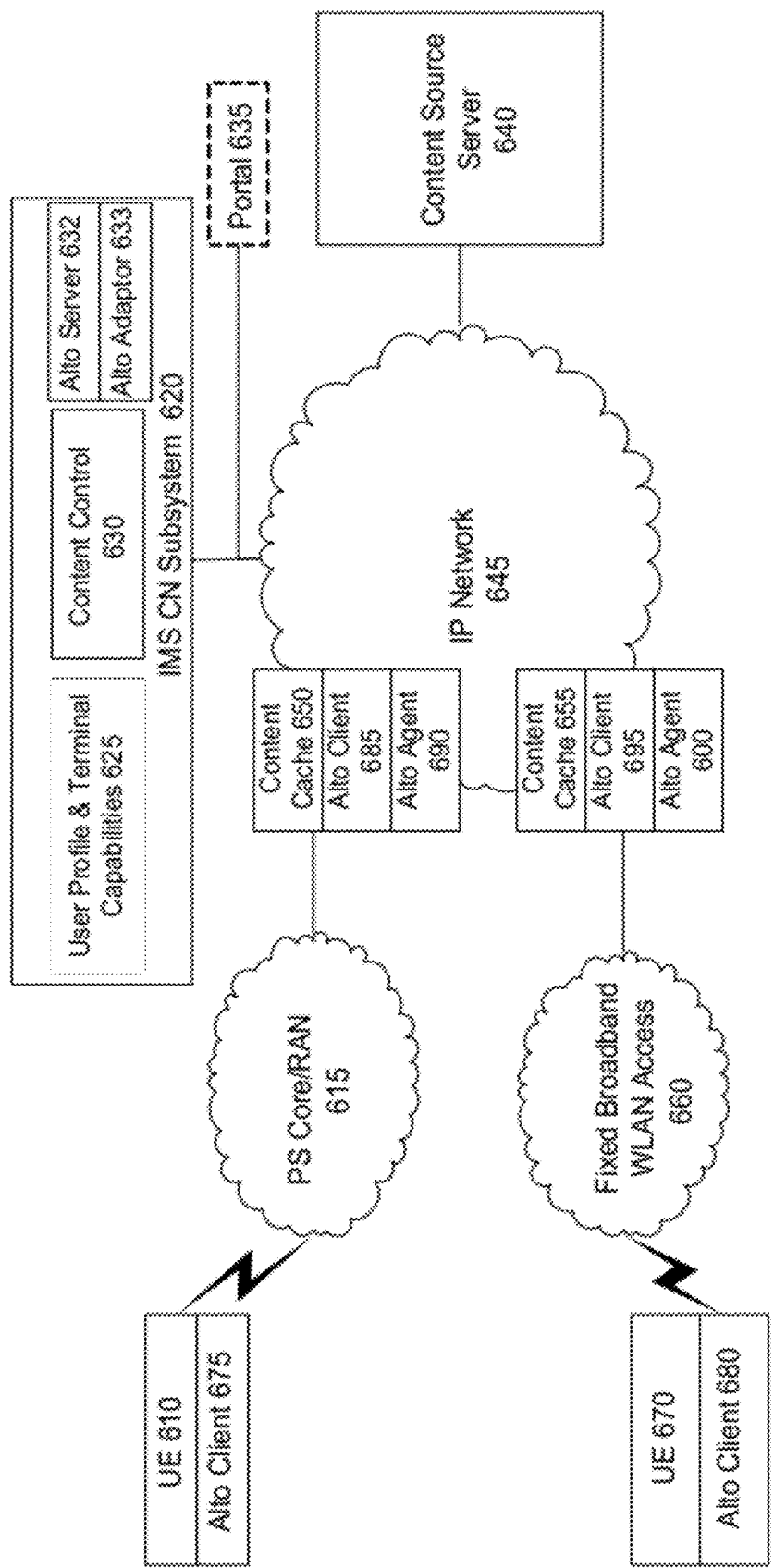
FIG. 6 illustrates an example architectural framework for delivering multimedia applications that includes ALTO service.

FIG. 6 illustrates an example architectural framework for delivering multimedia applications that includes ALTO service. As shown in FIG. 6, a P2P content distribution system may include one or more UEs that may be able to use an IP multimedia Subsystem (IMS), such as UE 610 and UE 670. The UEs may be able to communicate with IP Network 645, through a Packet Switched (PS) Core, a RAN, a fixed Broadband WLAN Access, or the like. For example, UE 610 may communicate with IP Network 645 via PS Core/RAN 615 and UE 670 may communicate with IP Network 645 via Fixed Broadband WLAN Access 660. IP Network 645 may be any network that handles IP address. For example, IP Network may be the Internet, an intranet, a WLAN, or the like.

IP Network 645 may be operatively connected to content cache 650, content cache 655, IMS Core Network (CN) subsystem 620, portal 665, content source server 640, or the like. Content cache 650 and content cache 655 may be content cache servers that cache media content. This may be done, for example, to off load data traffic from content source server 640. As an example, content cache 650 may cache content from content source server 640 and content cache 650 may provide the cached content to UE 610. Content source server 640 may be any server that provides, encodes, and/or saves content. For example, content source server 640 may be a social network, a webpage, Facebook, YouTube, or the like.

IP Network 645 may be operatively connected to IMS CN subsystem 620. IMS CN subsystem 620 may allow UEs, such as UE 610 and UE 670, to register on IMS. The IMS CN subsystem 620 may include user profile & terminal capabilities 625 and content control 630. User profile & terminal capabilities 625 may be a database that may store profiles for one or more UEs. User profile & terminal capabilities 625 may also store user information associated with one or more UEs and may store information regarding the capabilities of the one or more UEs. Content control 630 may include information regarding content sources, such as content source server 640, and may provide IMS CN subsystem 620 with the ability to control content on the IP Network 645. Content control 630 may also provide IMS CN subsystem 620 with the ability to control content sources, such as content source server 640.

As shown in FIG. 6, an IMS P2P architecture may be modified to include ALTO service. For example, as shown in FIG. 6, the UEs may implement ALTO clients such as ALTO client 675 and 680. For example, UE 610 may include ALTO client 675 that UE 610 may use to communicate with ALTO server 632 and UE 670 may include ALTO client 680 that UE 670 may use to communicate with ALTO server 632. Alternatively, the ALTO client may be included in a content cache rather than in a UE. For example, content cache 650 may include ALTO client 685 that UE 610 may use to communicate with ALTO server 632 and content cache 655 may include ALTO client 695 that UE 670 may use to communicate with ALTO server 632.

The IMS CN subsystem may include an ALTO adaptor that may be used to communicate with an ALTO server that may be external to the IMS CN subsystem. Alternatively, the IMS CN subsystem may include an ALTO adaptor and ALTO server. For example, IMS CN subsystem 620 may include ALTO server 632 and ALTO adaptor 633.

Using the architecture shown in FIG. 6 as an example, the UE 610, UE 670, content cache 650, and content cache 655 may be updated with ALTO client capabilities while the IMS CN subsystem may implement the ALTO server and ALTO service discovery as well as other components of the ALTO architecture.

Figure 7:
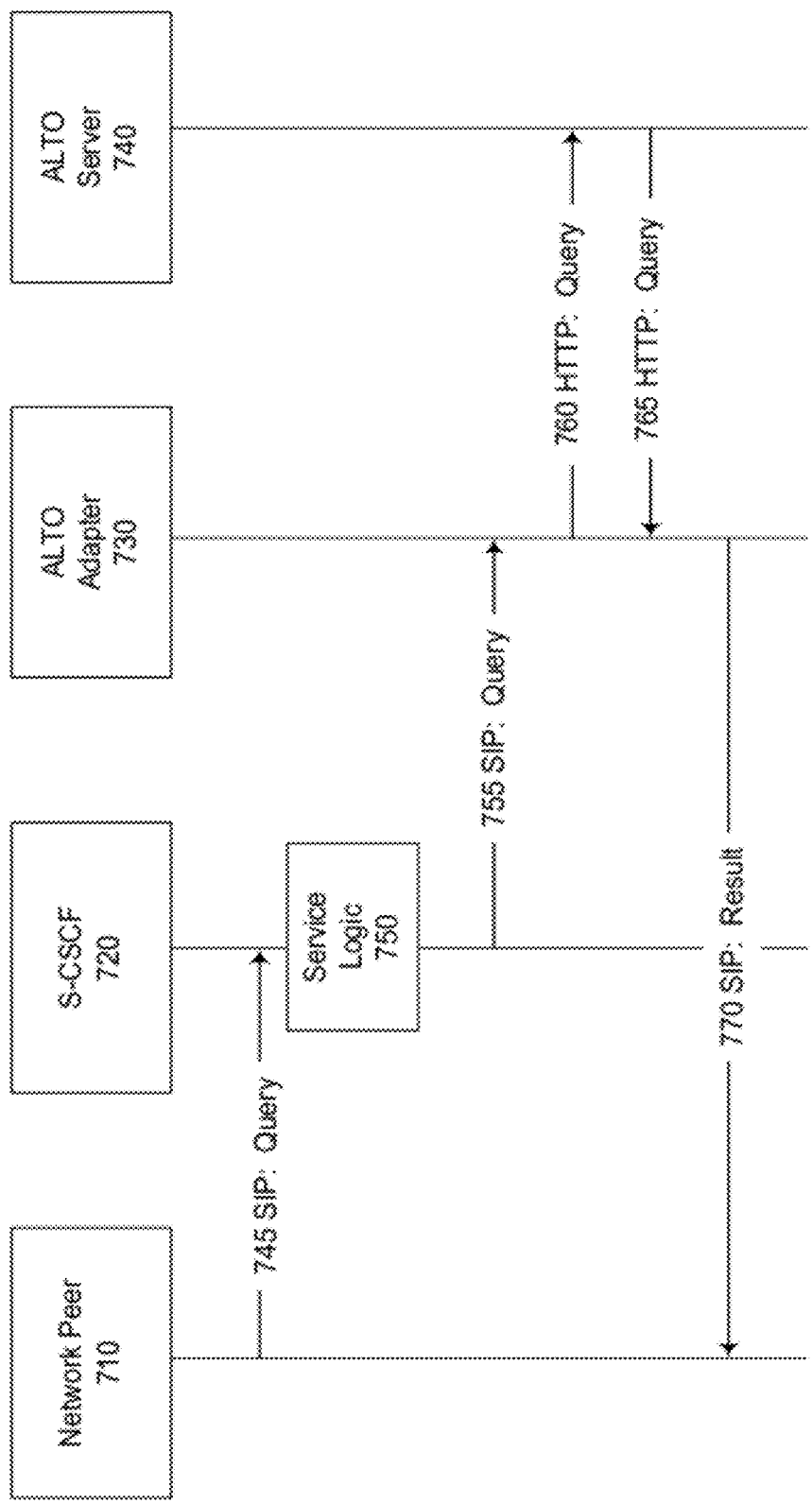
FIG. 7 illustrates an example process by which a UE or Network peer queries an ALTO server.

FIG. 7 shows an example of a process by which a UE or Network Peer queries an ALTO server for an embodiment using the IMS protocol.

At 745, Network Peer 710 may send a SIP message that carries an ALTO XML query message. The ALTO query message may carry a request for e information regarding network locations or cost values between source and destination locations. At 750, the message may reach serving call session control function (S-CSCF) 720, which may check for the service logic and may discover the underlying ALTO adaptor. At 755 3, S-CSCF 720 may forward the SIP message to ALTO adaptor 730. At 760, the ALTO adaptor may extract the XML message and may perform any necessary message translation from SIP to HTTP. When using protocols other than IMS, ALTO adaptor 730 may translate the corresponding protocol to HTTP. The translated message may then be forwarded to the ALTO server 740. At 765, an HTTP respond message may be sent back to ALTO adaptor 730. At 770, the ALTO adaptor may extract the XML response and may provide the response to Network Peer 710 via a SIP message.

A UE may also query the ALTO server using the IMS protocol. For example, a UE may send a SIP message that carries an ALTO XML query message. The ALTO query message may carry a request for information regarding network locations or cost values between source and destination locations. The message may reach the S-CSCF, which may check for the service logic and may discover the underlying ALTO adaptor. The S-CSCF may forward the SIP message to ALTO adaptor. The ALTO adaptor may extract the XML message and may perform any necessary message translation from SIP to HTTP. When using protocols other than IMS, the ALTO adaptor may translate the corresponding protocol to HTTP. The translated message may then be forwarded to the ALTO server. An HTTP respond message may be sent back to ALTO adaptor. The ALTO adaptor may extract the XML response and may provide the response to the UE via a SIP message.

Figure 8:
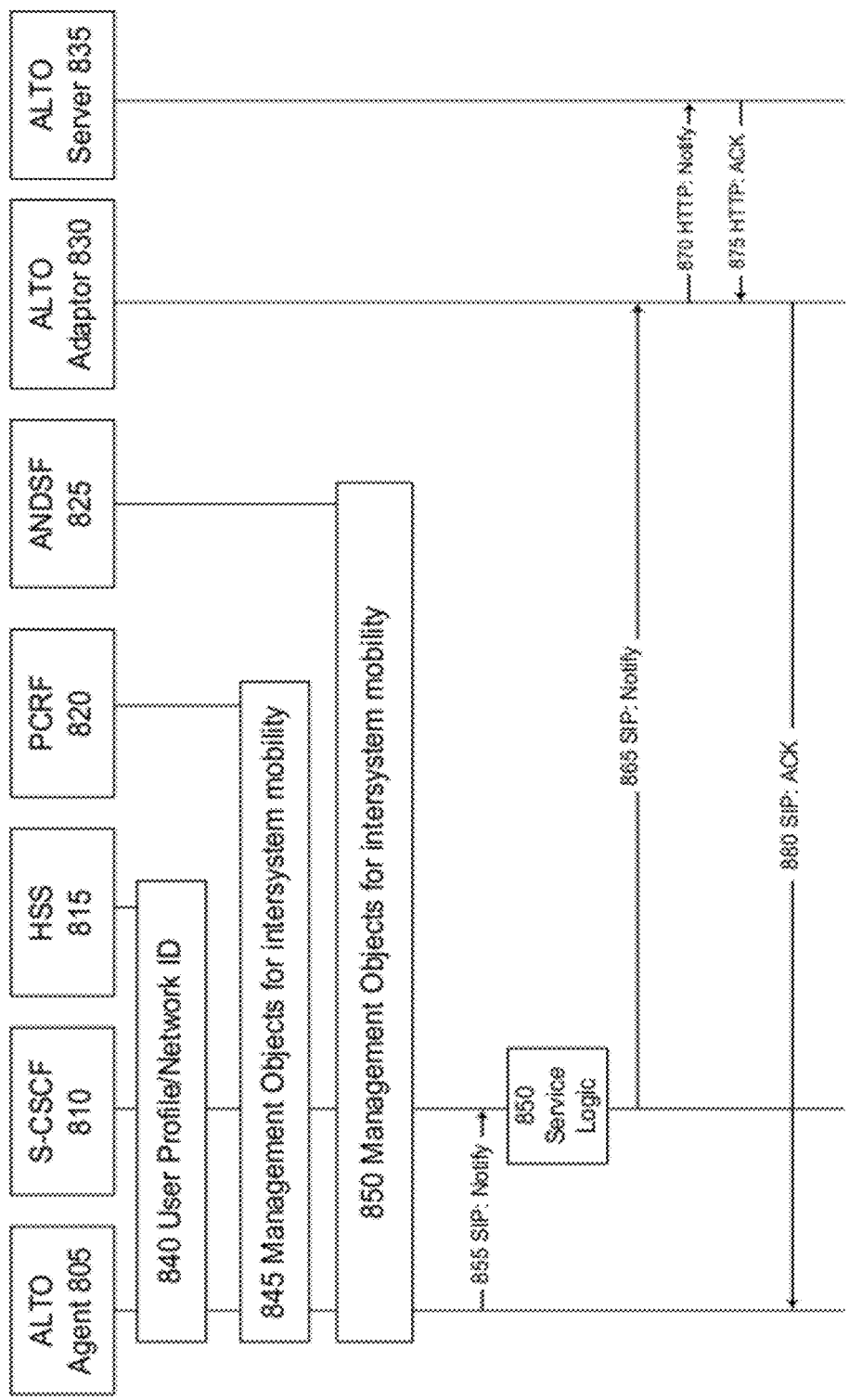
FIG. 8 illustrates an example process by which an ALTO agent updates an ALTO server.

FIG. 8 shows a sequence for a notify message transport from an ALTO agent to update a network or cost maps of the ALTO server. The ALTO agent may be a Network Peer or a UE.

At 840, ALTO agent 805 may collect information from home subscriber server 815 (HSS). At 845, ALTO agent 805 may collect information from policy charging and rules function 820 (PCRF). At 850, ALTO agent 805 may collect information from access network discovery and selection function 825 (ANDSF) using existing 3GPP interface. ALTO agent 805 may be located at Network Peer, a UE, a content cache, or the like. ALTO agent 805 may be used to provide ALTO server 835 with information related to an attached UE or other network peers within the proximity of ALTO agent 805.

At 855, ALTO agent 805 may send a SIP message that may carry an XML message that may update the database of ALTO server 835. At 860, the message may reach S-CSCF 810. S-CSCF 810 may check for the service logic and may discover underlying ALTO adaptor 830. At 865, S-CSCF 810 may forward the SIP message to ALTO adaptor 830. At 870, ALTO adaptor 830 may extract the XML message and may perform message translation from SIP to HTTP. The ALTO adaptor 830 may provide translation from wireless deployment protocols, such as SIP, to HTTP. The translated message may then be forwarded to ALTO server 835. At 875, an HTTP acknowledgement message may be sent back to the ALTO adaptor 830. At 880, ALTO adaptor 830 may formulate a SIP acknowledgement message and may forward it to ALTO agent 805.

Figure 9:
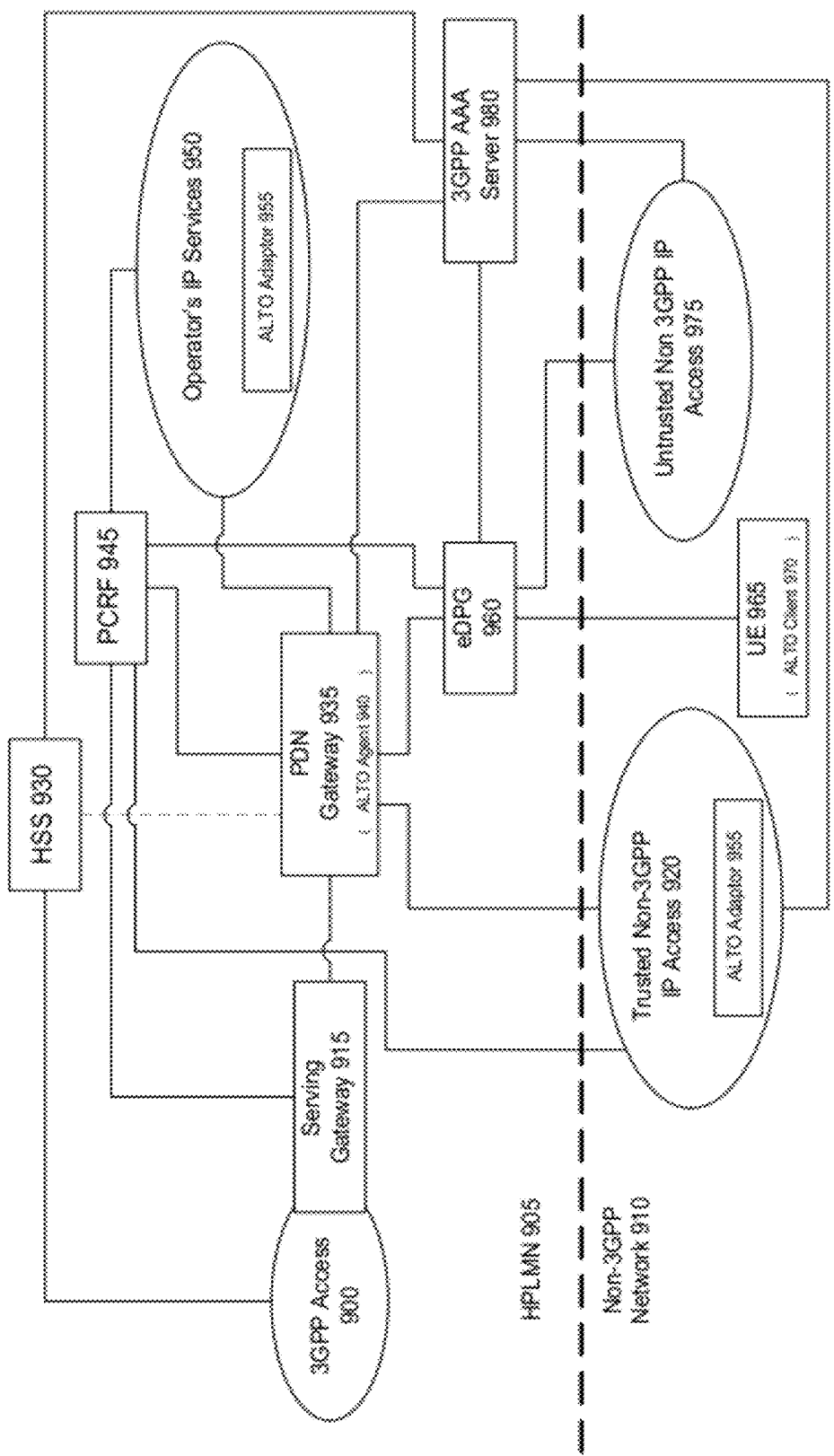
FIG. 9 illustrates an example architectural framework for a multi-access Packet Data Network (PDN).

FIG. 9 illustrates an example architectural framework for a multi-access Packet Data Network (PDN). The architectural framework may include home public land mobile network (HPLMN) 905 and non-3GPP Network 910. HPLMN 905 may include 3GPP Access 900, Serving Gateway 915, HSS 930, PDN Gateway 935, ALTO Agent 940 PCRF 945, Operator's IP Services 950, ALTO Adaptor 955, enhanced packet data gateway (ePDG) 960, and 3GPP AAA Server 980. Non-3GPP Network 910 may include Trusted Non-3GPP IP Acess 920, ALTO Server, 925, UE 965, ALTO client 970, and Untrusted Non-3GPP IP Access 975.

ALTO adaptor 955 may be implemented to perform bi-directional message translation between HTTP protocols used by ALTO Server 925 and underlying wireless access specific protocols that may be used for wireless deployment.

An ALTO service may be implemented with additional features. For example, a Home-evolved Node B (H(e)NB) subsystem may support Local IP access (LIPA) or Selected IP traffic offload (SIPTO). LIPA breakout may be performed in the same residential/enterprise IP network. SIPTO may allow the breakout to be located either in the residential/enterprise network as LIPA, or above H(e)NB in the hierarchical view of the mobile operator network. Accordingly, an ALTO service in LIPTP/SIPTO may be implemented that may determine unique network location address(es) for this gateway and may provide multiple cost metrics for each traffic passing or splitting through this gateway.

The ALTO service may address scenarios of devices with multiple interfaces (e.g. 3GPP, WiFi, WiMAX etc.). Some applications may be suited to run over 3GPP access systems. Other applications may be well suited to run over other access systems, such as ftp transfer via WiFi in parallel to VoIP over LTE. IP flow may be moved from one access to another access or access network may be attached to or detached from existing devices.

As shown in FIG. 9, UE 965 may include ALTO client 970 and PDN 935 gateway may include ALTO agent 940. ALTO Agent 940 may be used to populate the database of ALTO server 925. ALTO agent 940 may communicate with HSS 930 via 932, for example, to get UE location ID, user profile & terminal capabilities. Additionally, ALTO agent 940 may communicate with HSS 930 via 931 to enforce any network topology hiding policies. ALTO adaptor 955 may perform bi-directional protocol translation between ALTO server 925 and protocols for HPLMN 905. Accordingly, an ALTO service in a multi access PDN may be implemented that determines unique network location address(es) for this type of device and provides normalized cost metrics for each access network that the device might be able to use for sending/receiving traffic.

Alternative embodiments may be implemented in various contexts. For example, in FIG. 6, the content control service may be equipped with a feature of content-based networks, wherein a UE and a proxy cache are associated with particular content delivery that may be uniquely identified by a hierarchical (or flat) name structure. In this case, an embodiment may be implemented to generate a topology (or overlay network) for a particular named content and the associated performance related metric to allow UEs to easily located neighboring replicas of particular named content by, for example, providing the location information for copies of a named content. An embodiment may provide enhanced content control to place particular copy of a named content in an optimal manner, or may allow UEs and proxy caches to register for the delivery of a named content. An embodiment may provide enhanced video streaming of named content by allowing simultaneous streaming through virtual parallel paths. In one such embodiment, a content naming identifier may be attached in a hierarchal manner to generate new network location identifiers. For example, a network location IDCC that stores a copy of a multimedia object called MOVIE1 may be identified as \IDCC\MOVIE1. Furthermore, if IDCC contains MOVIE1 encoded into, for example, three different qualities, three different identifiers may be generated to point to them: \IDCC\MOVIE1\HIGHQUALITY, \IDCC\MOVIE1\

MEDIUMQUALITY and \IDCC\MOVIE1\LOWQUALITY. Such an embodiment may be used to generate named content based network maps and cost metrics.

For an embodiment, query results may be filtered by the ALTO Server using the longest prefix match of the named content identifier.

For an embodiment, implementation of an ALTO service may be used to generate a tree shaped architecture for application-layer multicasting used for distribution of popular video content. For an embodiment, implementation of an ALTO service may be used to determine if a P2P client in a roaming network may adjust its status as unreachable with the ALTO server to avoid consuming expensive bandwidth in the visited network by other peers.

For an embodiment, metrics may include fairness metrics of network peer participation in the P2P content distribution network that indicate the amount of the network peer resources are consumed by other peers.

For an embodiment, implementation of an ALTO service may be used to select the suitable media resource function (MRFC) for conferencing resources of users roaming in visited networks. For such an embodiment, the ALTO service maybe used by an application server to query the capabilities of neighboring MRFC(s) of a visited network to determine if any MRFC of the visited network has enough resource for roaming users.

Although features and elements are described above in particular combinations, one of ordinary skill in the art will appreciate that each feature or element maybe used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for providing traffic optimization, the method comprising:
    receiving a first session initiation protocol (SIP) signaling message from a call session control function (CSCF);
    extracting traffic optimization information for a first network peer from the first SIP signaling message, the traffic optimization information to be used to select a second network peer;
    generating a request message using a request-response protocol understood by an application layer traffic optimization (ALTO) server, the request message generated using the traffic optimization information;
    sending the request message to the ALTO server;
    receiving a traffic optimization message from the ALTO server in the request-response protocol, the traffic optimization message including an identity of the second network peer selected by the ALTO server;
    extracting the identity of the second network peer from the traffic optimization message;
    generating a second SIP signaling message that includes the identity of the second network peer, the second SIP signaling message suitable to instruct the first network peer to receive data from the second network peer; and
    sending the second signaling message to the first network peer.

2. The method of claim 1, wherein the traffic optimization information is at least one of a maximum bit rate, guaranteed bit rate, storage capacity, processor capabilities, number of clients serving, battery capabilities, reliability of path, or a supported video/audio codec.

3. The method of claim 1, wherein the traffic optimization information comprises a cost map that provides a cost for at least one path of a network.

4. The method of claim 1, wherein the request-response protocol is a hypertext transfer protocol (HTTP).

5. The method of claim 1, wherein the first network peer is a wireless transmit/receive unit.

6. A method for providing traffic optimization, the method comprising:
    receiving a first session initiation protocol (SIP) signaling message from a call session control function (CSCF);
    extracting traffic optimization information for a first network peer from the first SIP signaling message, the traffic optimization information to be used to select a second network peer;
    generating a request message in a request-response protocol understood by an application traffic optimization (ALTO) server, the request message generating using the traffic optimization information;
    sending the request message to the ALTO server;
    receiving an acknowledgement message from the ALTO server in the request-response protocol;
    generating a second SIP signaling message that includes an identity of the second network peer, the second SIP signaling message suitable to instruct the first network peer to receive data from the second network peer; and
    sending the second SIP signaling message to the first network peer.

7. The method of claim 6, wherein the traffic optimization information comprises network locations and cost values for paths between a source network location and a destination network location.

8. The method of claim 6, wherein the traffic optimization information comprises a cost map that provides a cost to use at least one path of a network.

9. The method of claim 6, wherein the traffic optimization information comprises information collected from a home subscriber server (HSS), a policy and charging rules function (PCRF), or an access network discovery and selection function (ANDSF).

10. The method of claim 6, wherein the traffic optimization information is at least one of a maximum bit rate, guaranteed bit rate, storage capacity, processor capabilities, number of clients serving, battery capabilities, reliability of path, or a supported video/audio codec.

11. The method of claim 6, wherein the request-response protocol is a hypertext transfer protocol (HTTP).

12. A device for providing traffic optimization information, the device comprising:
    a memory; and
    a processor configured to:
        receive a first session initiation protocol (SIP) signaling message from a call session control function (CSCF);

extract traffic optimization information for a first network peer from the first SIP signaling message, the traffic optimization information to be used to select a second network peer;

generate a request message using a request-response protocol understood by an application layer traffic optimization (ALTO) server, the request message generated using the traffic optimization;

send the request message to the ALTO server;

receive a traffic optimization message from the ALTO server in the request- response protocol, the traffic optimization message including an identity of the second network peer selected by the ALTO server;

extract the identity of the second network peer from the traffic optimization message;

generate a second SIP signaling message that includes the identity of the second network peer, the second SIP signaling message suitable to instruct the first network peer to receive data from the second network peer; and send the second signaling message to the first network peer.

13. The device of claim 12, wherein the traffic optimization information is at least one of a maximum bit rate, guaranteed bit rate, storage capacity, processor capabilities, number of clients serving, battery capabilities, reliability of path, or a supported video/audio codec.

14. The device of claim 12, wherein the traffic optimization information comprises network locations and cost values for paths
between a source network location and a destination network location.

15. The device of claim 12, wherein the traffic optimization information comprises a cost map that provides a cost to use at least one path of a network.

* * * * *